(12) United States Patent
Endo

(10) Patent No.: US 9,854,151 B2
(45) Date of Patent: Dec. 26, 2017

(54) IMAGING DEVICE AND FOCUSING CONTROL METHOD

(71) Applicant: FUJIFILM Corporation, Tokyo (JP)

(72) Inventor: Hisashi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/080,903

(22) Filed: Mar. 25, 2016

(65) Prior Publication Data
US 2016/0212324 A1 Jul. 21, 2016

Related U.S. Application Data

(63) Continuation of application No. PCT/JP2014/071744, filed on Aug. 20, 2014.

(30) Foreign Application Priority Data

Sep. 27, 2013 (JP) ................. 2013-201253

(51) Int. Cl.
*H04N 5/232* (2006.01)
*G03B 13/00* (2006.01)
(Continued)

(52) U.S. Cl.
CPC ........... *H04N 5/23212* (2013.01); *G02B 7/09* (2013.01); *G02B 7/28* (2013.01); *G02B 7/34* (2013.01);
(Continued)

(58) Field of Classification Search
CPC ... G02B 7/28; G02B 7/34; G02B 7/09; G03B 13/36; G03B 17/14; H04N 5/2254; H04N 5/2253; H04N 5/23212
See application file for complete search history.

(56) References Cited

U.S. PATENT DOCUMENTS

| 2008/0002048 A1* | 1/2008 | Ito | G02B 7/365 |
| | | | 348/345 |
| 2012/0062786 A1* | 3/2012 | Hamano | G02B 7/38 |
| | | | 348/345 |
| 2014/0320730 A1* | 10/2014 | Kim | G03B 13/36 |
| | | | 348/345 |

FOREIGN PATENT DOCUMENTS

JP 2001-21794 A 1/2001

OTHER PUBLICATIONS

English Translation of International Preliminary Report on Patentability (including PCT/IB/373 and PC/ISA/237) for PCT/JP2014/071744, dated Mar. 29, 2016.
(Continued)

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

The present invention provides an imaging device and a focusing control method capable of enhancing accuracy of moving subject estimation while reducing the computation of the moving subject estimation used in a case of continuously performing focusing with respect to the moving subject. A system control unit (11) predicts a subject distance in an imaging process of a third frame from information about subject distances obtained in an imaging process of a first frame and an imaging process of a second frame, calculates an error with respect to the predicted subject distance from information about a maximum error with respect to a focus lens position to be calculated, and performs lens driving based on a predicted focus lens position instead of a focusing control based on the predicted subject distance in a case that the error of the subject distance is large.

4 Claims, 9 Drawing Sheets

(51) Int. Cl.
G02B 7/28 (2006.01)
G02B 7/34 (2006.01)
G03B 13/36 (2006.01)
G02B 7/09 (2006.01)
G03B 17/14 (2006.01)
H04N 5/225 (2006.01)

(52) U.S. Cl.
CPC ............ *G03B 13/36* (2013.01); *G03B 17/14* (2013.01); *H04N 5/2253* (2013.01); *H04N 5/2254* (2013.01)

(56) References Cited

OTHER PUBLICATIONS

International Search Report for PCT/JP2014/071744 (PCT/ISA/210) dated Nov. 25, 2014.
Written Opinion of the International Searching Authority for PCT/JP2014/071744 (PCT/ISA/237) dated Nov. 25, 2014.

\* cited by examiner

IMAGING DEVICE AND FOCUSING CONTROL METHOD

CROSS-REFERENCE TO RELATED APPLICATIONS

This application is a Continuation of PCT International Application No. PCT/JP2014/071744 filed on Aug. 20, 2014, which claims priority under 35 U.S.C §119(a) to Japanese Patent Application No. 2013-201253 filed on Sep. 27, 2013. Each of the above application(s) is hereby expressly incorporated by reference, in its entirety, into the present application.

BACKGROUND OF THE INVENTION

1. Field of the Invention

The present invention relates to an imaging device and a focusing control method.

2. Description of the Related Art

In recent years, according to increase in resolution of a solid-state imaging element such as a charge coupled device (CCD) image sensor or a complementary metal oxide semiconductor (CMOS) image sensor, demand for an information device having an imaging function, such as a digital still camera, a digital video camera, a mobile phone such as a smart phone, or a personal digital assistant (PDA) has rapidly increased. The information device having the above-mentioned imaging function is referred to as an imaging device.

In such an imaging device, as a focusing control method of focusing on a main subject, a contrast auto-focus (AF) method or a phase difference AF method is employed.

An imaging device having a mode of having a lens driving to follow up a moving subject is also known. For example, JP2001-21794A discloses an imaging device that predicts a future image formation position from information about image formation positions calculated plural times in the past, and performs lens driving so that the predicted image formation position and a light receiving surface of an imaging element match each other in the next exposure.

SUMMARY OF THE INVENTION

When a distance from an object to a principal point of a lens (subject distance) is represented as b, a distance from the principal point of the lens to an image formation surface of the object (image formation surface distance) is represented as a, and a distance between the principal point of the lens and a focus of the lens (focal distance) is represented as f, Expression (1) of $(1/a)+(1/b)=(1/f)$ is established.

To multiply both sides of Expression (1) by abf, thereby Expression (2) of $af+bf=ab$ is obtained.

Here, when a deviation amount between the focus of the lens and the image formation surface is represented as an image deviation amount a', the relationship of Expression (3) of $a=f+a'$ is obtained.

To substitute Expression (3) into Expression (2), Expression (4) of $a'(f-b)=-f^2$ is obtained.

In Expression (4), assuming that the subject distance is sufficiently long, (f-b) is approximated to -b, thereby Expression (5) of $a'=f^2/b$ is obtained.

When Expression (3) is substituted into Expression (5), Expression (6) of $a=(f^2/b)+f$ is obtained.

In this way, it can be understood from Expression (6) that the image formation distance a is in a reciprocal relationship with the subject distance. Thus, when a subject moves in a far and near direction at a uniform speed and is observed on an image formation surface of the subject, intervals between the image formation surface distances a at respective subject positions do not become uniform. Accordingly, in order to accurately predict the image surface distance a, it is necessary to use a prediction expression of polynomial expression as disclosed in JP2001-21794A, but which causes an increase in computation.

In order to solve the above-mentioned problems, an object of the invention is to provide an imaging device capable of enhancing accuracy of moving subject estimation while reducing the computation of the moving subject estimation used in a case of continuously performing focusing with respect to the moving subject.

According to an aspect of the invention, there is provided an imaging device that includes an imaging element that images a subject through an imaging optical system including a focus lens, the imaging element including a first signal detection unit that detects a signal corresponding to one beam of a pair of beams that pass through different portions in a pupil region of the imaging optical system, and a second signal detection unit that detects a signal corresponding to the other beam of the pair of beams, and the imaging device including: a focusing control unit that drives the focus lens to perform a focusing control for focusing on a main subject; a focus lens position generation unit that calculates a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element; a subject distance conversion unit that converts the focus lens position calculated by the focus lens position generation unit into a subject distance which is a distance between the main subject and the focus lens; a subject distance prediction unit that predicts, from the subject distance generated by the subject distance conversion unit and corresponding to each of plural times of image capturing that continue in a time series manner, a subject distance in image capturing performed subsequent to the last image capturing among the plural times of image capturing; a focus lens position prediction unit that predicts, from the focus lens position generated by the focus lens position generation unit and corresponding to each of the plural times of image capturing that continue in a time series manner, a focus lens position in the image capturing performed subsequent to the last image capturing among the plural times of image capturing; and a maximum error information acquisition unit that acquires information about a maximum error with respect to the focus lens position generated by the focus lens position generation unit, in which the focusing control unit selects any one of a first focusing control and a second focusing control as a focusing control performed before the image capturing performed subsequent to the last image capturing, based on the focus lens position generated by the focus lens position generation unit and corresponding to each of the plural times of image capturing that continue in a time series manner and the information about the maximum error, where the first focusing control drives the focus lens according to the focus lens position predicted by the lens position prediction unit and the second focusing control drives the focus lens according to the subject distance predicted by the subject distance prediction unit.

According to another aspect of the invention, there is provided a focusing control method for an imaging device that includes an imaging element that images a subject through an imaging optical system including a focus lens, the imaging element including a first signal detection unit that detects a signal corresponding to one beam of a pair of beams that pass through different portions in a pupil region of the imaging optical system, and a second signal detection unit that detects a signal corresponding to the other beam of the pair of beams, and the focusing control method including: a focus lens position generation step of calculating a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element; a subject distance conversion step of converting the focus lens position calculated in the focus lens position generation step into a subject distance which is a distance between the main subject and the focus lens; a subject distance prediction step of predicting, from the subject distance generated in the subject distance conversion step and corresponding to each of plural times of image capturing that continue in a time series manner, a subject distance in image capturing performed subsequent to the last image capturing among the plural times of image capturing; a focus lens position prediction step of predicting, from the focus lens position generated in the focus lens position generation step and corresponding to each of the plural times of image capturing that continue in a time series manner, a focus lens position in the image capturing performed subsequent to the last image capturing among the plural times of image capturing; a maximum error information acquisition step of acquiring information about a maximum error with respect to the focus lens position generated in the focus lens position generation step; and a focusing control step of selecting any one of a first focusing control and a second focusing control as a focusing control performed for the image capturing performed subsequent to the last image capturing, based on the focus lens position generated in the focus lens position generation step and corresponding to each of the plural times of image capturing that continue in a time series manner and the information about the maximum error, where the first focusing control drives the focus lens according to the focus lens position predicted in the focus lens position prediction step and the second focusing control drives the focus lens according to the subject distance predicted in the subject distance prediction step, and executing the selected focusing control before the image capturing performed subsequent to the last image capturing.

According to the invention, it is possible to provide an imaging device capable of enhancing accuracy of moving subject estimation while reducing the computation of the moving subject estimation used in a case of continuously performing focusing with respect to the moving subject.

DESCRIPTION OF THE PREFERRED EMBODIMENTS

Hereinafter, embodiments of the invention will be described with reference to the accompanying drawings.

Figure 1:
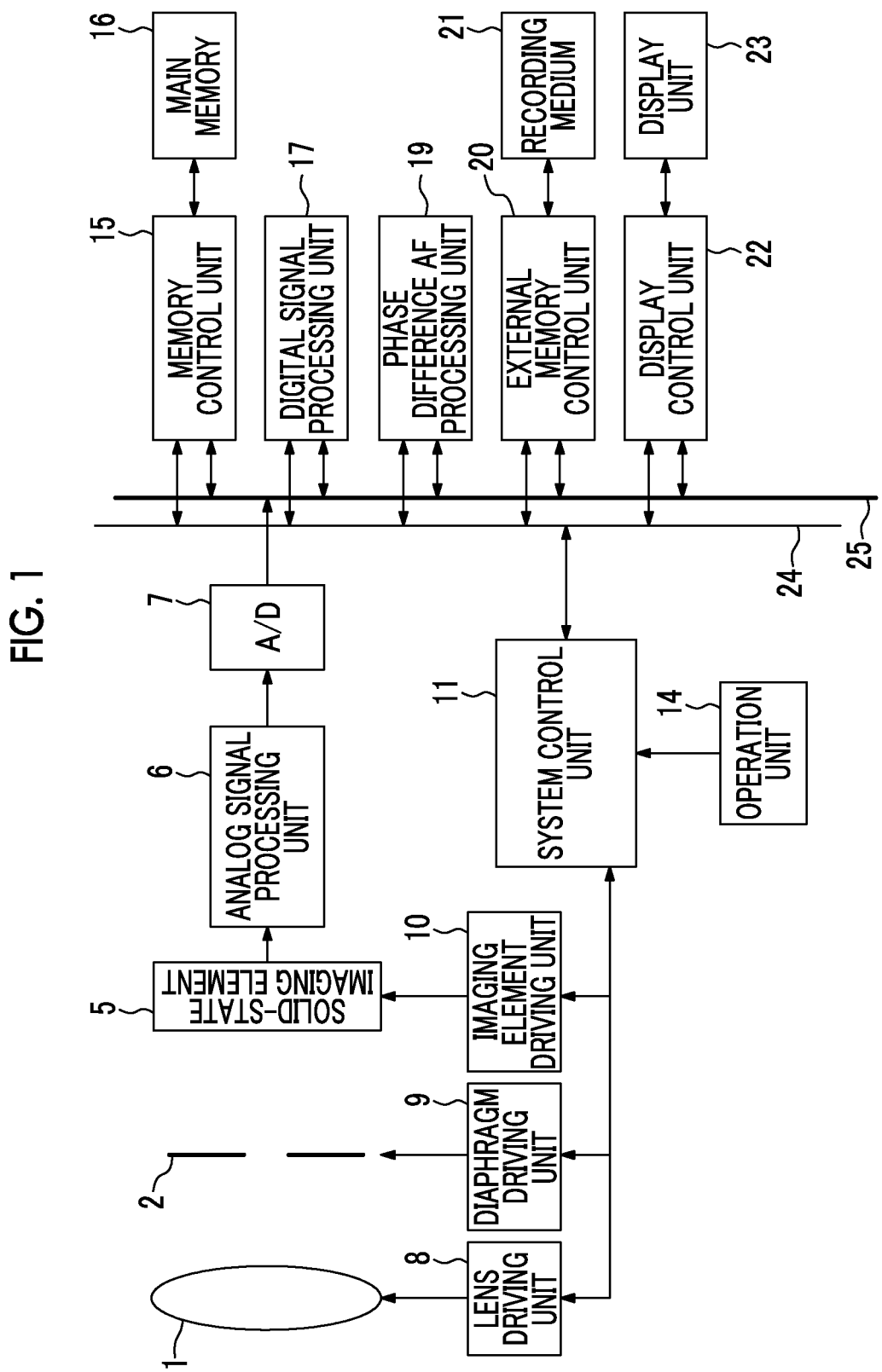
FIG. 1 is a diagram illustrating a schematic configuration of a digital camera which is an example of an imaging device illustrating an embodiment of the invention.

FIG. 1 is a diagram illustrating a schematic configuration of a digital camera which is an example of an imaging device for describing an embodiment of the invention.

The digital camera shown in FIG. 1 includes a lens device that includes an imaging lens 1 that includes a focus lens for focus adjustment, a zoom lens, or the like and a diaphragm 2. The lens device forms an imaging optical system. The lens device is fixed to a camera main body. The imaging lens 1 may include at least the focus lens. Further, a single focus lens that performs focus adjustment by moving the entirety of the lens system may be used.

The camera main body includes a solid-state imaging element 5 of a CCD type, a CMOS type, or the like that images a subject through the lens device, an analog signal processing unit 6 that is connected to an output end of the solid-state imaging element 5 and performs analog signal processing such as a correlated double sampling process, and an A/D conversion circuit 7 that converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be built in the solid-state imaging element 5.

The system control unit 11, which generally controls the entirety of an electric control system of the digital camera, controls a lens driving unit 8 to adjust the position of the focus lens included in the imaging lens 1 to perform a focusing control for focusing on a main subject, or to adjust the position of the zoom lens included in the imaging lens 1. Further, the system control unit 11 controls the degree of opening of the diaphragm 2 through a diaphragm driving unit 9 to adjust a light exposure value. The system control unit 11 functions as a focusing control unit.

Further, the system control unit 11 drives the solid-state imaging element 5 through an imaging element driving unit 10, and outputs a subject image captured through the imaging lens 1 as a captured image signal. An instruction signal from a user is input to the system control unit 11 through an operation unit 14.

In addition, the electric control system of the digital camera includes a main memory 16, a memory control unit 15 connected to the main memory 16, a digital signal processing unit 17 that generates captured image data by performing an interpolation operation, a gamma correction operation, a RGB/YC conversion process, and the like with respect to a captured image signal output from the A/D conversion circuit 7, a phase difference AF processing unit 19 that determines a focusing position according to a phase difference AF method, an external memory control unit 20 to which a detachable recording medium 21 is connected, and a display control unit 22 to which a display unit 23 mounted on a rear surface or the like of the camera is connected.

The memory control unit 15, the digital signal processing unit 17, the phase difference AF processing unit 19, the external memory control unit 20, and the display control unit 22 are connected to each other through a control bus 24 and a data bus 25, and are controlled by instructions from the system control unit 11.

Figure 2:
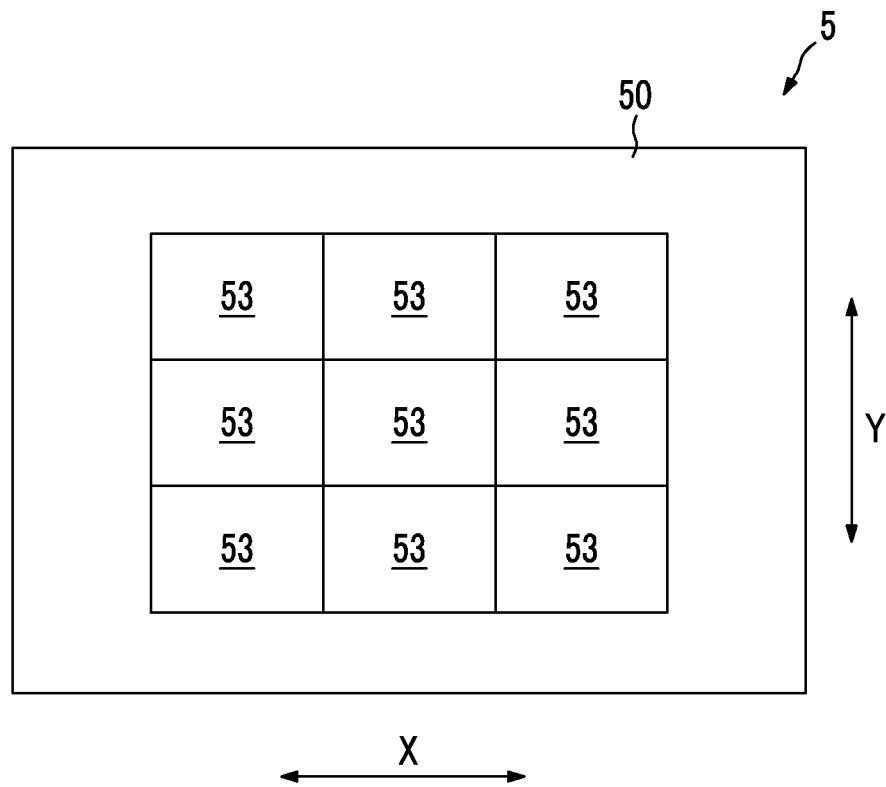
FIG. 2 is a schematic plan view illustrating an overall configuration of a solid-state imaging element 5 mounted on the digital camera shown in FIG. 1.

FIG. 2 is a schematic plan view illustrating an overall configuration of the solid-state imaging element 5 mounted on the digital camera shown in FIG. 1.

The solid-state imaging element 5 includes a light receiving surface 50 on which multiple pixels which are arranged in a two-dimensional pattern in a row direction X and in a column direction Y orthogonal to the row direction X. Nine AF areas 53 which are target areas for focusing are provided on the light receiving surface 50 in the example of FIG. 2.

The AF area 53 is an area that includes an imaging pixel and a phase difference detection pixel as pixels.

In a portion where the AF areas 53 are excluded on the light receiving surface 50, only imaging pixels are disposed. The AF areas 53 may be provided on the light receiving surface 50 without a gap.

Figure 3:
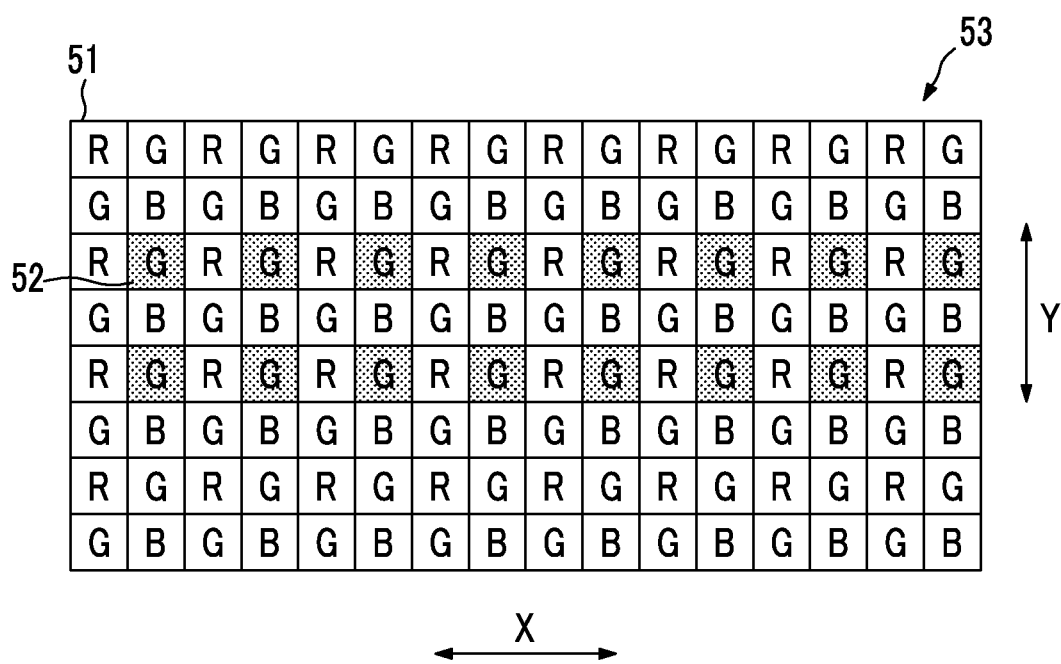
FIG. 3 is a partially enlarged view of a single AF area 53 shown in FIG. 2.

FIG. 3 is a partially enlarged view of a single AF area 53 shown in FIG. 2.

Pixels 51 are arranged in the AF area 53 in a two-dimensional pattern. Each pixel 51 includes a photoelectric conversion unit such as a photo diode, and a color filter formed above the photoelectric conversion unit.

In FIG. 3, letter "R" is given to a pixel 51 (R pixel 51) including a color filter (R filter) that transmits red light, letter "G" is given to a pixel 51 (G pixel 51) including a color filter (G filter) that transmits green light, and letter "B" is given to a pixel 51 (B pixel 51) including a color filter (B filter) that transmits blue light. The array of the color filters is a Bayer array over the entirety of the light receiving surface 50.

In the AF area 53, a part of the G pixels 51 (shaded pixels 51 in FIG. 3) are used as the phase difference detection pixels 52. In the example of FIG. 3, each G pixel 51 in an arbitrary pixel row among pixel rows including the R pixels 51 and the G pixels 51, and the G pixel 51 closest to each G pixel 51 in the column direction Y are used as the phase difference detection pixels 52. Here, as shown in FIG. 3, one direction in the two-dimensional array is defined as the X direction or the row direction, and the other direction is defined as the Y direction or the column direction.

Figure 4:
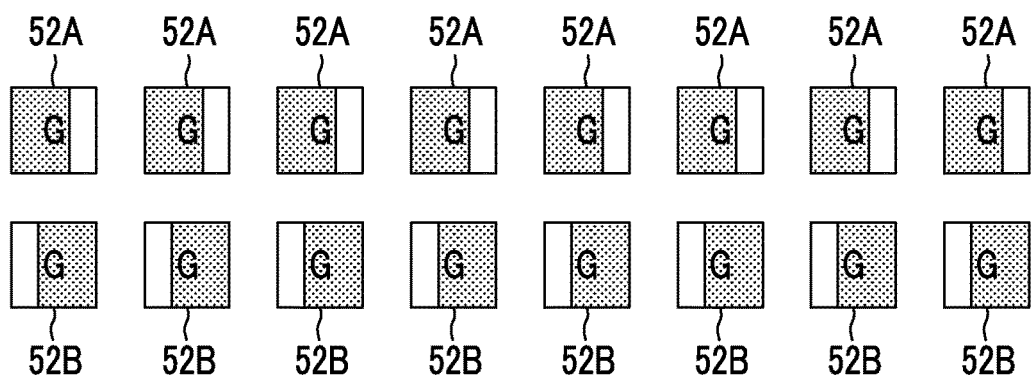
FIG. 4 is a diagram illustrating only a phase difference detection pixel 52 shown in FIG. 3.

FIG. 4 is a diagram illustrating only the phase difference detection pixels 52 shown in FIG. 3.

As shown in FIG. 4, the phase difference detection pixels 52 include two-type pixels of phase difference detection pixels 52A and phase difference detection pixels 52B.

The phase difference detection pixel 52A is a first signal detection unit that receives one beam of a pair of beams that pass through different portions in a pupil region of the imaging lens 1, and detects a signal depending on the intensity of received light.

The phase difference detection pixel 52B is a second signal detection unit that receives the other beam of the pair of beams, and detects a signal depending on the intensity of received light.

In the AF area 53, plural pixels 51 other than the phase difference detection pixels 52A and 52B are imaging pixels, and each imaging pixel receives the pair of beams that pass through the imaging lens 1, and detects a signal depending on the intensity of received light.

A light shielding film is provided above the photoelectric conversion unit of each pixel 51, and an opening for defining a light receiving area of the photoelectric conversion unit is formed on the light shielding film.

The center of the opening of the imaging pixel 51 matches the center of the photoelectric conversion unit of the imaging pixel 51. On the other hand, the center of the opening (white portion in FIG. 4) of the phase difference detection pixel 52A is eccentric rightward with respect to the center of the photoelectric conversion unit of the phase difference detection pixel 52A. Further, the center of the opening (white portion in FIG. 4) of the phase difference detection pixel 52B is eccentric leftward with respect to the center of the photoelectric conversion unit of the phase difference detection pixel 52B. Here, the right direction represents one direction along the X direction shown in FIG. 3, and the left direction represents the other direction along the X direction.

With such a configuration, it is possible to detect a phase difference in the row direction X in images respectively captured by two pixel groups, that is, a pixel group that includes the phase difference detection pixels 52A which are positioned in an arbitrary row, and a pixel group that includes the phase difference detection pixels 52B which are disposed at the same distance in the same direction with respect to each of the phase difference detection pixels 52A of the former pixel group.

The phase difference AF processing unit 19 shown in FIG. 1 calculates a phase difference which is a relative position deviation amount between two images formed by the pair of beams using a detection signal group read from the phase difference detection pixels 52A and the phase difference detection pixels 52B disposed in one AF area 53 selected by a user operation or the like from among nine AF areas 53.

Further, the phase difference AF processing unit 19 generates information about the position of the focus lens when an image formation surface of the main subject based on the imaging lens 1 and a light receiving surface of the imaging element 5 match each other, based on the phase difference. The phase difference AF processing unit 19 functions as a focus lens position generation unit. Specifically, the phase difference AF processing unit 19 calculates a defocus amount from the phase difference, converts the defocus amount into the number of driving pulses of a motor that drives the focus lens, and uses the number of driving pulses as information indicating the position of the focus lens for obtaining a focused state.

In this description, a closest end in a range where the focus lens may be movable is used as a reference position, and a distance (the number of driving pulses) from the reference position is used as a focus lens position.

Instead of one AF area 53, plural AF areas 53 which are continuously arranged may be selected.

The phase difference calculated by the phase difference AF processing unit 19 is not calculated at the level of accuracy which is equal to or greater than an arrangement interval in the row direction X of the phase difference detection pixels 52A or the phase difference detection pixels 52B. In the example of FIG. 3, since the phase difference detection pixels 52A are arranged at an interval of one pixel, it is possible to detection the phase difference in a one-pixel unit. However, it is impossible to detect a phase difference of a distance shorter than the interval of one pixel. For example, even in a case where an image captured by the phase difference detection pixel 52A and an image captured by the phase difference detection pixel 52B are deviated by a distance of 0.5 pixel in the row direction X, the phase difference is detected as one pixel, which causes an error corresponding to the distance of 0.5 pixel.

Further, even in a case where the same subject is captured, the phase difference calculated by the phase difference AF processing unit 19 changes according to an F value of the imaging lens 1 (a value obtained by dividing the focus distance of the imaging lens 1 by the aperture of the imaging lens 1 (an opening diameter of the diaphragm 2 when the diaphragm 2 is opened)), a diaphragm value in imaging, a zoom magnification in imaging, a noise of the solid-state imaging element 5, or the like. Accordingly, the above-described error changes according to the F value of the imaging lens 1, the diaphragm value in imaging, the zoom magnification in imaging, the noise of the solid-state imaging element 5, or the like.

The digital camera shown in FIG. 1 stores in advance information about a maximum error generated with respect to the focus lens position for obtaining the focused state generated in the phase difference AF processing unit 19 (hereinafter, referred to as a maximum error) in the main memory 16.

As a method of calculating the maximum error, there is a method of performing imaging, with respect to a subject for which a focus lens position in a focused state is known by variously changing a combination of a diaphragm value and a zoom magnification, and calculating a difference between the largest value among focus lens positions calculated from phase differences obtained in the respective combinations and the known focus lens position as the maximum error.

Further, there is a method of calculating the maximum error from the arrangement interval of the phase difference detection pixels 52 in the row direction X and the F value of the imaging lens 1.

Figure 5:
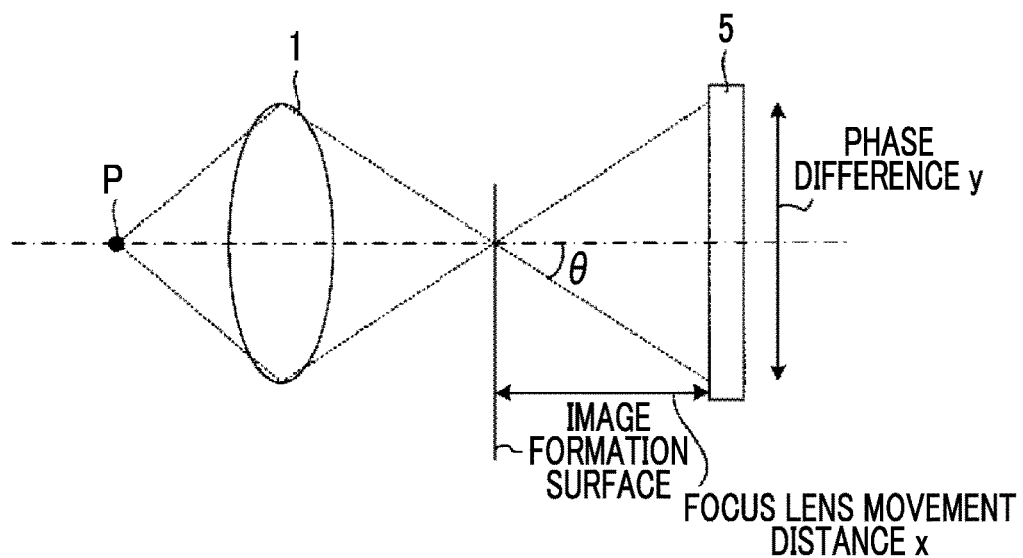
FIG. 5 is a diagram illustrating a calculation method of a maximum error with respect to a focus lens position.

FIG. 5 is a diagram illustrating a method of calculating a maximum error through an operation.

As shown in FIG. 5, a distance between an image formation surface which is a surface on which a main subject P is image-formed by the imaging lens 1 and a light receiving surface of the solid-state imaging element 5 is represented as x, a phase difference calculated by the phase difference AF processing unit 19 is represented as y, and an incidence angle of light that is incident on the image formation surface from the main subject P is represented as θ.

Since the F value of the imaging lens 1 is in a relationship of "F value=2/tan(θ)", "tan(θ)=2/(F value)" is obtained.

Further, the distance x satisfies x=y/2 tan(θ). Here, in the case that tan(θ)=2/(F value) is substituted therein, x=y*(F value)/4 is obtained.

Here, as described above, since the value of y cannot be detected as a value smaller than the arrangement interval of the phase detection pixels in the row direction X, a value obtained by converting a value obtained by substituting the arrangement interval in Expression of x=y*(F value)/4 into the number of driving pulses becomes the maximum error. In this way, it is possible to calculate the maximum error from information about the arrangement interval of the phase difference detection pixels and information about the F value of the imaging lens 1.

Hereinafter, an operation of the digital camera in a continuous photographing mode where an imaging process of performing image capturing (still image capturing) by the solid-state imaging element 5 in a state of being focused on a main subject is continuously performed plural times (hereinafter, it is assumed that the imaging process is performed K times) will be described. The imaging includes processes from starting exposure of the solid-state imaging element 5 to reading of a captured image signal obtained through the exposure from the solid-state imaging element 5.

The continuous photographing mode is set, thereby the system control unit 11 starts imaging for live view image display using the solid-state imaging element 5. Thus, a series of processes of imaging by the solid-state imaging element 5, generating captured image data from a captured image signal obtained by the imaging, and displaying a live view image on the display unit 23 based on the captured image data is repeated.

A continuous imaging start instruction is given through an operation of a shutter button included in the operation unit 14 and the like, thereby the phase difference AF processing unit 19 acquires detection signals of the phase difference detection pixels 52A and the phase difference detection pixels 52B disposed in a selected AF area 53 from the captured image signals obtained by imaging immediately before the instruction is given, and performs a correlation operation between detection signal groups of the phase difference detection pixels 52A and the phase difference detection pixels 52B.

The phase difference AF processing unit 19 calculates a phase difference from the correlation operation result, calculates a focus lens position for obtaining a focused state from the phase difference, and stores the calculated focus lens position in the main memory 16 in association with the calculated point in time (step S1).

Then, the system control unit 11 acquires information about the focus lens position calculated by the phase difference AF processing unit 19, performs a focusing control for moving the focus lens to the focus lens position, and then, captures an image of N-th frame in continuous imaging by the solid-state imaging element 5 (step S2). An initial value of N is "1".

Captured image data is generated from a captured image signal acquired by imaging in step S2 by the digital signal processing unit 17, and the captured image data is stored in the recording medium 21.

Subsequent to step S2, the system control unit 11 terminates the continuous imaging when N is K (step S3: YES), whereas the phase difference AF processing unit 19 performs a process of step S4 when N is not K (step S3: NO).

In step S4, the phase difference AF processing unit 19 calculates a focus lens position for obtaining a focused state using detection signals of the phase difference detection pixels included in the captured image signals acquired by imaging in step S2, and stores the calculated focus lens position in the main memory 16 in association with the calculated point in time.

Subsequent to step S4, the system control unit 11 acquires, from the main memory 16, a focus lens position of which the associated point in time is the latest (referred to as a focus lens position 11) and a focus lens position of which the associated point in time is the second latest (referred to as a focus lens position 12) among the focus lens positions stored in the main memory 16, and converts the acquired focus lens positions 11 and 12 into subject distances (step S5). The system control unit 11 functions as a subject distance conversion unit.

In the focused state, since the light receiving surface of the solid-state imaging element 5 and the image formation surface of the imaging lens 1 match each other, the focus lens position for obtaining the focused state corresponds to the above-described image formation surface distance a which is a distance between a principal point of the imaging lens 1 and the image formation surface.

Accordingly, in step S5, the system control unit 11 substitutes the focus distance of the imaging lens 1 for "f" in Expression (6) and substitutes the focus lens position 11 for "a" in Expression (6) to solve Expression (6) with respect to "b", to thereby convert the focus lens position 11 into a subject distance L1. Further, the system control unit 11 substitutes the focus distance of the imaging lens 1 for "f" in Expression (6) and substitutes the focus lens position 12 into "a" in Expression (6) to solve Expression (6) with respect to "b", to thereby convert the focus lens position 12 into a subject distance L2.

Subsequent to step S5, the system control unit 11 predicts a subject distance L3 in image capturing of a frame next to the N-th frame using the subject distance L1 and the subject distance L2 (step S6). A method of estimating the subject distance may employ a known method. The system control unit 11 functions as a subject distance prediction unit.

Then, the system control unit 11 converts the predicted subject distance L3 into a focus lens position 13. The system control unit 11 substitutes the subject distance L3 for "b" in Expression (6), to thereby obtain the focus lens position 13 (step S7).

Then, the system control unit 11 acquires information about a maximum error (here, referred to as α) with respect to the focus lens position generated by the position phase difference AF processing unit 19 from the main memory 16 (step S8). The system control unit 11 functions as a maximum error information acquisition unit.

Then, the system control unit 11 converts into a value obtained by adding α to the focus lens position 13 into a subject distance L3a according to Expression (6), and converts a value obtained by subtracting α from the focus lens position 13 into a subject distance L3b according to Expression (6) (step S9).

Figure 7:
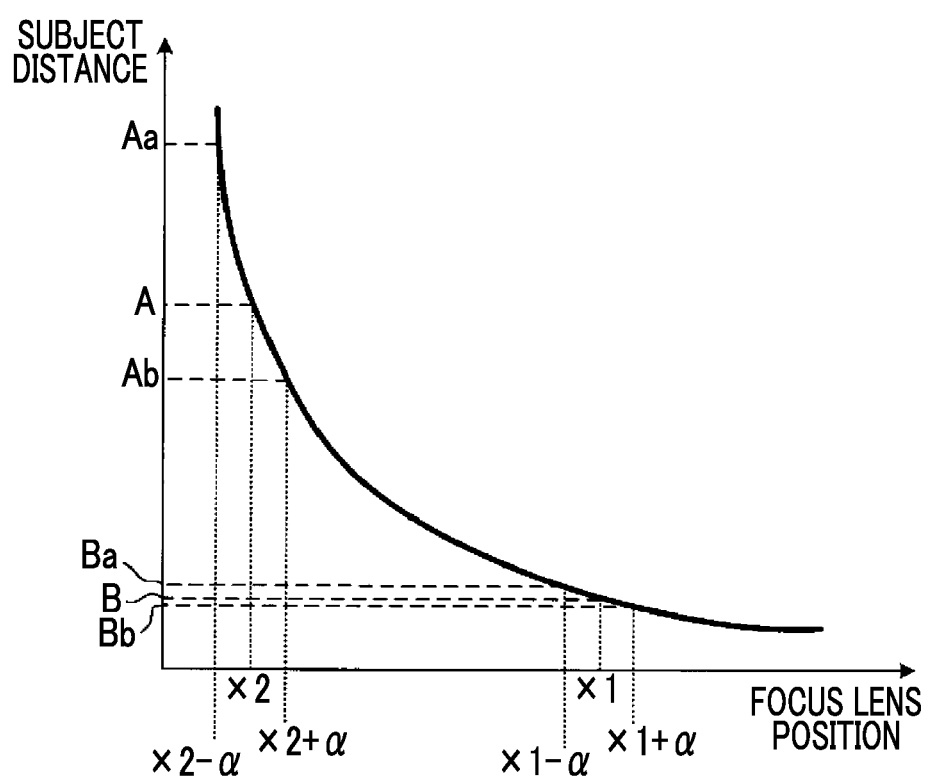
FIG. 7 is a diagram illustrating a relationship between a subject distance and a focus lens position in a focused state.

FIG. 7 is a diagram illustrating a relationship between a subject distance (b) and a focus lens position (image surface distance a) in a focused state.

As shown in FIG. 7, in a case where the subject distance is B, a focus lens position converted from the subject distance B becomes x1, and a difference (an absolute value with its sign ignored) between each of a subject distance Bb corresponding to a value obtained by adding α which is the maximum error to x1 and a subject distance Ba corresponding to a value obtained by subtracting α which is the maximum error from x1 becomes a small value and the subject distance B.

On the other hand, in a case where the subject distance is A which is sufficiently larger than B, a focus lens position converted from the subject distance A is x2, and a difference (an absolute value with its sign ignored) between each of a subject distance Ab corresponding to a value obtained by adding α which is the maximum error to x2 and a subject distance Aa corresponding to a value obtained by subtracting α which is the maximum error from x2 becomes a large value and the subject distance A.

In this way, in a case where the subject distance predicted based on the plural focus lens positions generated by the phase difference AF processing unit 19 is large, an error with respect to the predicted distance also becomes large due to the maximum error with respect to the focus lens positions.

Thus, if the focusing control is performed according to the predicted subject distance, the focusing accuracy is lowered.

Accordingly, in step S10, the system control unit 11 determines whether a difference between the subject distance L3a and the subject distance L3b exceeds a threshold value TH. Then, the system control unit 11 performs a process of step S11 in a case where the difference exceeds the threshold value TH, whereas the system control unit 11 performs a process of step S12 in a case where the difference does not exceed the threshold value TH.

In step S11, the system control unit 11 predicts a focus lens position 13a in imaging of the frame next to the N-th frame from the focus lens positions 11 and 12. The system control unit 11 functions as a focus lens position prediction unit. A method of estimating the focus lens positions may employ a known method such as the technique disclosed in PTL 1.

Subsequent to step S11, the system control unit 11 performs a focusing control (a first focusing control) for moving the focus lens to the predicted focus lens position 13a (step S13).

In step S12, the system control unit 11 performs a focusing control (a second focusing control) for moving the focus lens to the focus lens position 13 converted from the predicted subject distance L3.

Subsequent to step S12 and step S13, N is changed to (N+1) in step S14, and then, the process of step S2 is performed.

As described above, according to the digital camera shown in FIG. 1, only when the subject distance L3 predicted in step S6 is large, the processes of steps S11 and S13 are performed (a process of predicting a future focus lens position from plural previous focus lens positions thereby performing focusing control). Thus, compared with a related art technique that constantly predicts a focus lens position and performs focusing control, it is possible to reduce the computation necessary for prediction of a moving subject, to enhance a follow-up speed with respect to the moving subject, and to realize reduction in power consumption.

Figure 6:
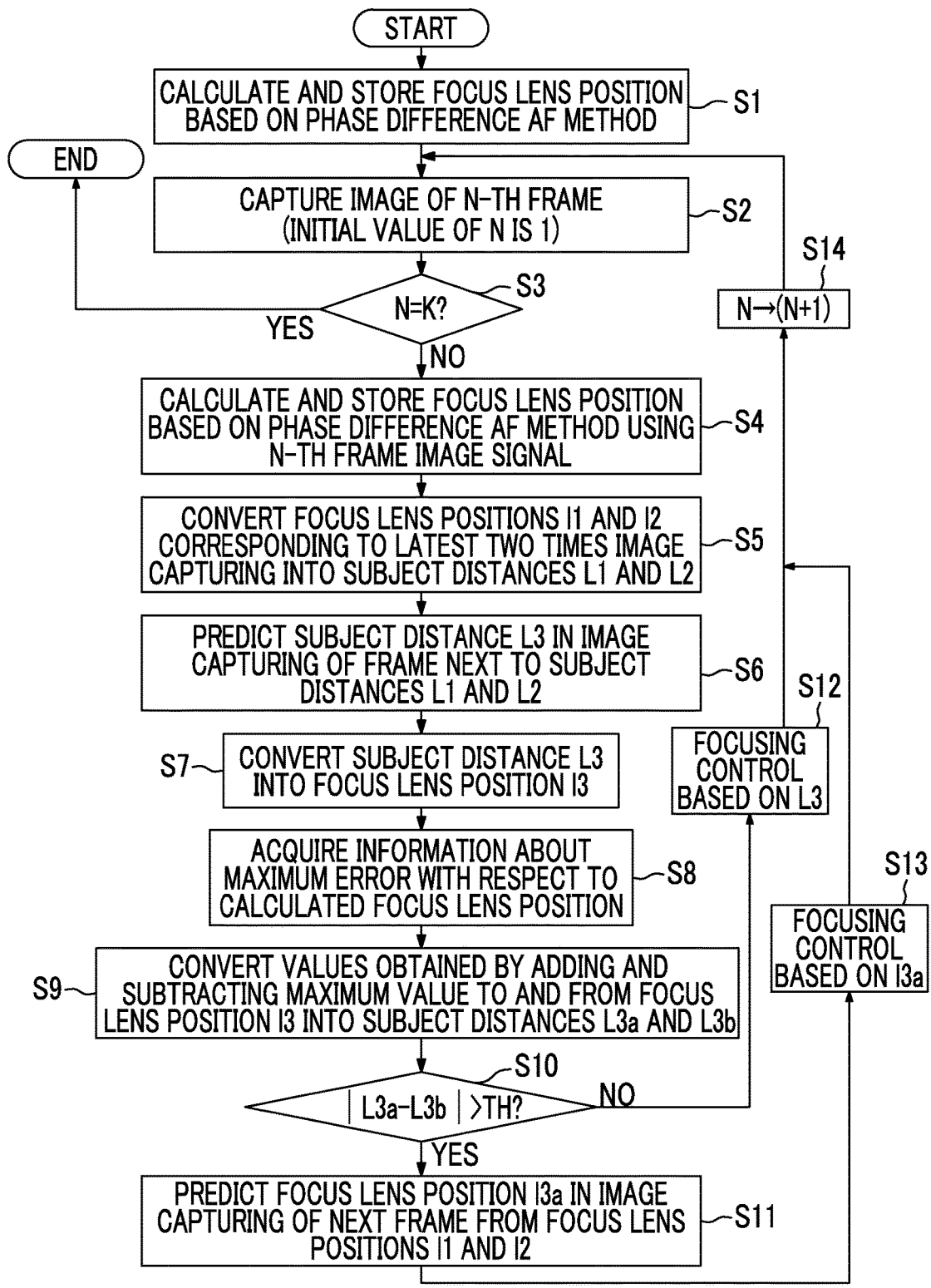
FIG. 6 is a flowchart illustrating an operation in a continuous photographing mode of the digital camera shown in FIG. 1.

In FIG. 6, as an error that may occur in calculating a subject distance in image capturing of frames to be performed from now on, first, the subject distance L3 is predicted, the subject distance L3a and the subject distance L3b are generated from the subject distance L3 and information about a maximum error, and a difference between the subject distance L3a and the subject distance L3b is calculated as the error is shown. Hereinafter, a modification example of the method of calculating the error will be described.

Figure 8:
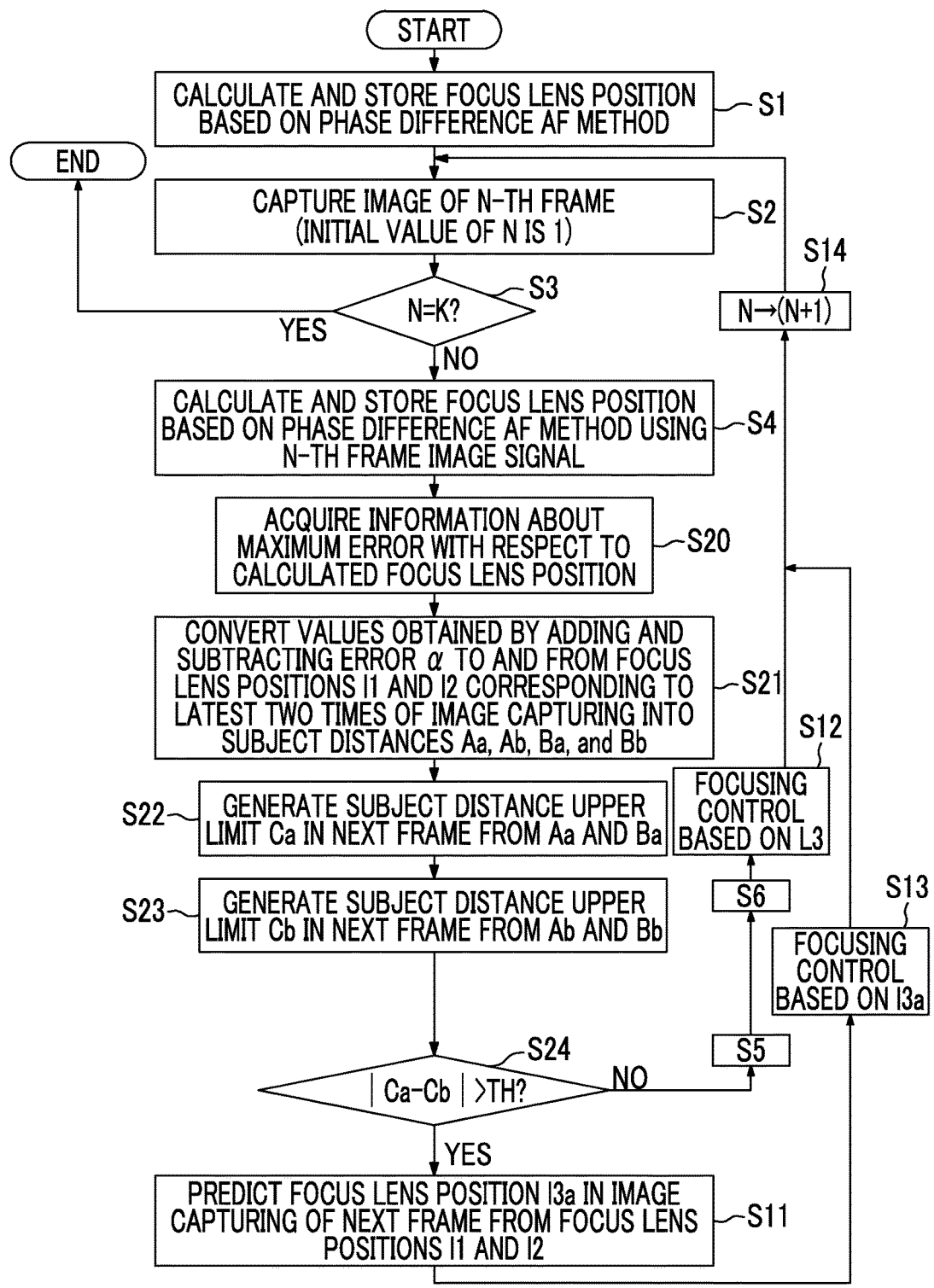
FIG. 8 is a flowchart illustrating a modification example of a calculation method of an error that occurs in a subject distance.

FIG. 8 is a flowchart illustrating a modification example of a calculation method of an error that may occur in a subject distance. In FIG. 8, the same reference numerals are given to the same processes as in FIG. 6, and description thereof will not be repeated.

Subsequent to step S4, the system control unit 11 acquires information about a maximum error (here, referred to as a) with respect to focus lens positions generated by the phase difference AF processing unit 19 from the main memory 16 (step S20).

Then, the system control unit 11 acquires a focus lens position of which the associated point in time is the latest (referred to as a focus lens position 11) and a focus lens position of which the associated point in time is the second latest (referred to as a focus lens position 12) among the focus lens positions stored in the main memory 16, from the main memory 16.

Further, the system control unit 11 converts a value obtained by adding the maximum error α to the focus lens position 11 into a subject distance Ba, and converts a value obtained by subtracting the maximum error α from the focus lens position 11 into a subject distance Bb. In addition, the system control unit 11 converts a value obtained by adding the maximum error α to the focus lens position 12 into a subject distance Aa, and converts a value obtained by subtracting the maximum error α from the focus lens position 12 into a subject distance Ab (step S21).

Figure 9:
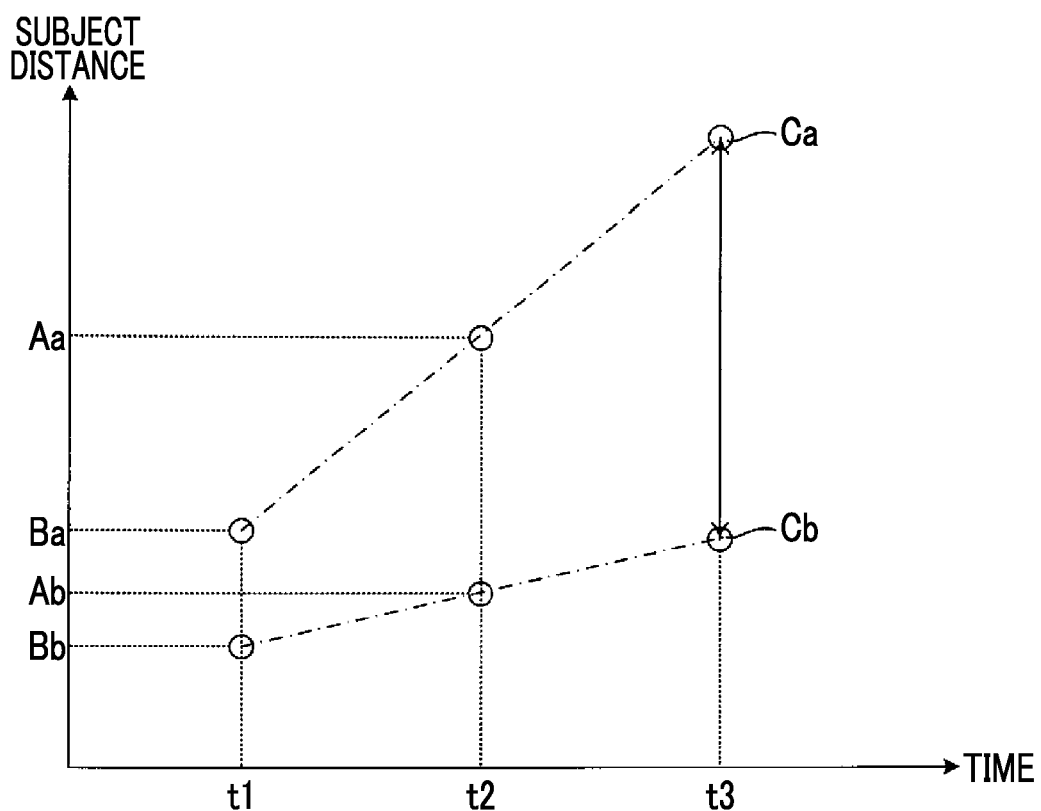
FIG. 9 is a diagram illustrating steps S22 and S23 in the operation in FIG. 8.

Through the above-mentioned processes, as shown in FIG. 9, two subject distances (black circles) are generated with respect to a point in time t1, and two subject distances (black circles) are generated with respect to a point in time t2.

Subsequent to step S21, the system control unit 11 predicts a subject distance Ca which is an error upper limit value of a subject distance in an imaging point in time t3 of the next frame using the subject distance Ba and the subject distance Aa (step S22). Further, the system control unit 11 predicts a subject distance Cb which is an error lower limit of a subject distance in the point in time t3 using the subject distance Bb and the subject distance Ab (step S23).

Then, the system control unit 11 determines whether a difference between the distance Ca and the distance Cb exceeds a threshold value TH. Then, the system control unit 11 performs the process of step S11 in a case where the difference exceeds the threshold value TH, whereas in a case where the difference does not exceed the threshold value TH, sequentially performs the processes of step S5 in FIG. 6 and step S6 in FIG. 6, and then, performs the process of step S12.

According to the operation of FIG. 8, in a case where the determination in step S24 is "YES", it is not necessary to perform the process of predicting the subject distance L3 to be used in step S12. Thus, it is possible to reduce an unnecessary operation, to thereby reduce power consumption.

Hereinbefore, the description has been made on the assumption that the lens device is fixed to the main body of the camera. However, the invention may be applied to a lens exchangeable digital camera in which a lens device is detachably mounted to a main body of a camera.

In the case of the lens exchangeable digital camera, the system control unit 11 acquires information about an F value and a focus distance of an imaging lens included in the lens device from a storage unit built in the lens device. The system control unit 11 functions as an F value acquisition unit. Further, the system control unit 11 acquires information about an arrangement interval from the main memory 16 which is a storage unit that stores the information about the arrangement interval of phase difference detection pixels, calculates a maximum error using the information and the F value acquired from the lens device, and stores the result in the main memory 16. Further, the system control unit 11 generates a function shown in Expression (6) from the focus distance acquired from the lens device, and stores the result in the main memory 16.

Information about an F value and a focus distance of an imaging lens in a lens to be exchanged may be manually input to the system control unit 11 by a user.

The system control unit 11 performs a conversion process from a focus lens position to a subject distance and a conversion process from the subject distance to the focus lens position according to the function stored in the main memory 16, in the operation flows shown in FIGS. 6 and 8. Further, in step S9, the system control unit 11 acquires the subject distances L3a and L3b using the information about the maximum error stored in the main memory 16.

In this way, in the lens exchangeable digital camera, by generating the function of Expression (6) and the maximum error corresponding to the lens device to be mounted, and storing the result in a memory, similarly, it is possible to enhance a follow-up speed with respect to a moving subject, to thereby realize reduction in power consumption.

In this description, the digital camera is used as an example of the imaging device, but hereinafter, an embodiment in which a smart phone with a camera is used as the imaging device will be described.

Figure 10:
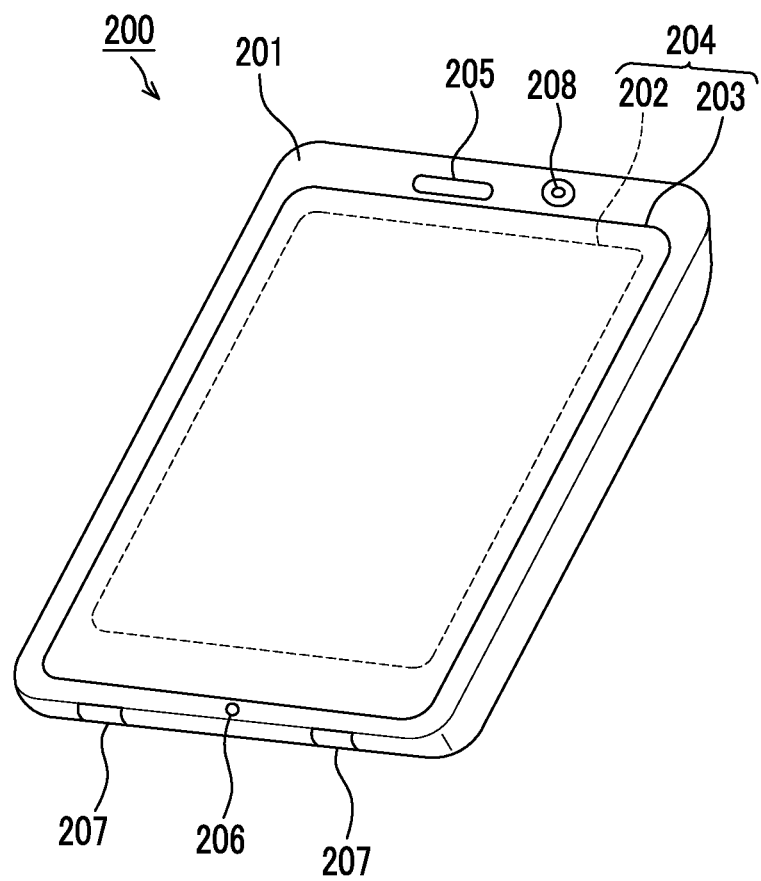
FIG. 10 is a diagram illustrating a smart phone as an imaging device.

FIG. 10 is a diagram illustrating an appearance of a smart phone 200 which is an embodiment of the imaging device of the invention. The smart phone 200 shown in FIG. 10 includes a flat housing 201, and is provided with a display input unit 204 integrally formed by a display panel 202 that is a surface on one side of the flat housing 201 as a display unit and the operation panel 203 as an input unit. Further, the housing 201 is provided with a speaker 205, a microphone 206, an operation unit 207, and a camera unit 208. The configuration of the housing 201 is not limited thereto, and for example, a configuration in which the display unit and the input unit are independently provided may be employed, or a configuration in which a folding structure or a slide mechanism is provided may be employed.

Figure 11:
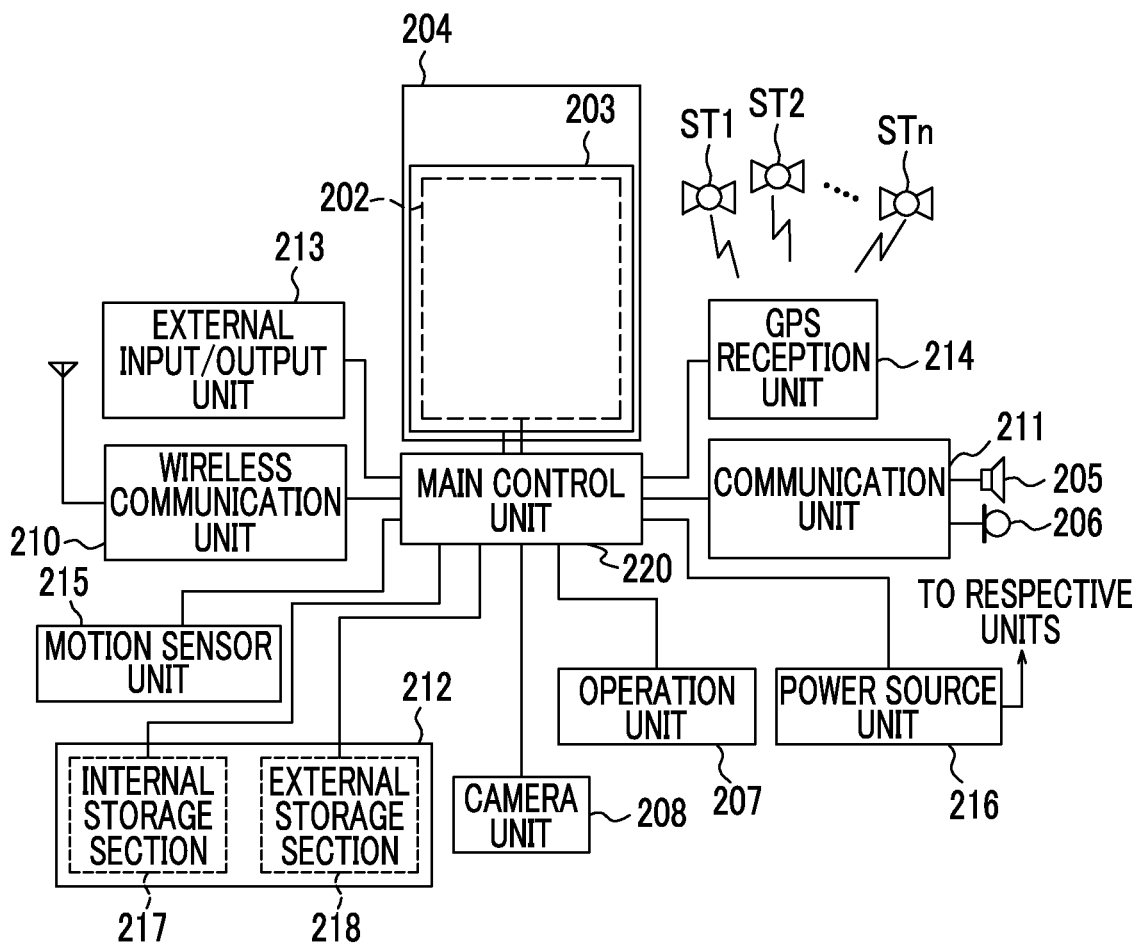
FIG. 11 is an internal block diagram of the smart phone shown in FIG. 10.

FIG. 11 is a block diagram illustrating a configuration of the smart phone 200 shown in FIG. 10. As shown in FIG. 11, as main components of the smart phone, a wireless communication unit 210, the display input unit 204, a communication unit 211, the operation unit 207, the camera unit 208, a storage unit 212, and an external input/output unit 213, a global positioning system (GPS) receiving unit 214, a motion sensor 215, a power source 216, and a main control unit 220 are provided. Further, as main functions of the smart phone 200, a wireless communication function for performing mobile wireless communication through a base station BS (not shown) and a mobile communication network NW (not shown) is provided.

The wireless communication unit 210 performs wireless communication with the base station BS included in the mobile communication network NW according to an instruction of the main control unit 220. The wireless communication unit 210 performs transmission and reception of a variety of file data such as sound data or image data, e-mail data, or the like, or performs reception of Web data, streaming data, or the like, using the wireless communication.

The display input unit 204 is a so-called touch panel that displays an image (still image and moving image), character information, or the like under the control of the main control unit 220 to visually transmit information to a user, and detects a user operation with respect to the displayed information. The display input unit 204 includes the display panel 202 and the operation panel 203.

The display panel 202 uses a liquid crystal display (LCD), an organic electro-luminescence display (OLED), or the like as a display device.

The operation panel 203 is a device mounted on a display surface of the display panel 202 that an image displayed thereon can be visually recognized, and detects one or plural coordinates operated by a user's finger or a stylus. In the case that the device is operated by the user's finger or the stylus, a detection signal generated due to the operation is output to the main control unit 220. Then, the main control unit 220 detects an operation position (coordinates) on the display panel 202 based on the received detection signal.

As shown in FIG. 10, the display panel 202 and the operation panel 203 of the smart phone 200 shown as an example of the imaging device of the invention are integrated to form the display input unit 204, in which the operation panel 203 is arranged to completely cover the display panel 202.

In a case where such an arrangement is employed, the operation panel 203 may have a function of detecting a user operation even in a region out of the display panel 202. In other words, the operation panel 203 may include a detection region with respect to a portion that overlaps the display panel 202 (hereinafter, referred to as a display region), and a detection region with respect to an outer edge portion that does not overlap the display panel 202 (hereinafter, referred to as a non-display region).

The size of the display region and the size of the display panel 202 may completely be the same, but it is not essential that both of the sizes are the same. Further, the operation panel 203 may include two sensitive regions of an outer edge portion and an inner portion other than the outer edge portion. Further, the width of the outer edge portion is appropriately set according to the size or the like of the housing 201. Furthermore, as a position detecting method employed in the operation panel 203, any one of a matrix switch type, a resistive film type, a surface elastic wave type, an infrared type, an inductive coupling type, a capacitance type, and the like may be employed.

The communication unit 211 includes the speaker 205 and the microphone 206, and converts user's voice input through the microphone 206 into voice data capable of being processed by the main control unit 220 and outputs the result to the main control unit 220, or decodes voice data received by the wireless communication unit 210 or the external input/output unit 213 and outputs the result through the speaker 205. Further, as shown in FIG. 10, for example, the speaker 205 may be mounted on the same surface as the surface where the display input unit 204 is provided, and the microphone 206 may be mounted on a side surface of the housing 201.

The operation unit 207 is a hardware key using a key switch or the like, and receives an instruction from the user. For example, as shown in FIG. 10, the operation unit 207 is a push button switch that is mounted on a side surface of the housing 201 of the smart phone 200, is turned on when being pressed by a finger or the like, and is turned off by a restoring force of a spring or the like when the finger is separated.

The storage unit 212 stores a control program or control data of the main control unit 220, application software, address data in which a name, a telephone number, and the like of a communication partner are associated with each other, data on transmitted or received e-mail, Web data downloaded by a Web browser, or data on downloaded content, and temporarily stores streaming data or the like. Further, the storage unit 212 includes an internal storage section 217 built in the smart phone, and an external storage section 218 provided with a detachable memory slot. Each of the respective internal storage section 217 and the external storage section 218 that form the storage unit 212 is realized using a storage medium such as a flash memory type, a hard disk type, a multimedia card micro type memory, a card type memory (for example, MicroSD (registered trademark) memory or the like), a random access memory (RAM), a read only memory (ROM), or the like.

The external input/output unit 213 serves as an interface with respect to all types of external devices to be connected to the smart phone 200, and is configured to be directly or indirectly connected to other external devices through communication or the like (for example, universal serial bus (USB), IEEE1394, or the like) or a network (for example, Internet, wireless LAN, Bluetooth (registered trademark), radio frequency identification (RFID), Infrared Data Association (IrDA, registered trademark), Ultra Wideband (UWB, registered trademark), ZigBee (registered trademark), or the like).

As the external device connected to the smart phone 200, for example, a wired or wireless headset, a wired or wireless external charger, a wired or wireless data port, a memory card, a subscriber identity module card (SIM) or a user identity module card (UIM) card connected through a card socket, an external audio/video device connected through an audio/video input/output (I/O) terminal, an external audio/video device connected in a wireless manner, a smart phone connected in a wired or wireless manner, a personal computer connected in a wired or wireless manner, a PDA connected in a wired or wireless manner, an earphone, or the like is used. The external input/output unit 213 may be configured to transmit data transmitted and received from the external device to respective components in the smart phone 200, or to transmit data in the smart phone 200 to the external device.

The GPS receiving unit 214, according to an instruction of the main control unit 220, receives GPS signals transmitted from GPS satellites ST1 to STn, executes a positioning operation process based on the plural received GPS signals, and detects the position of the smart phone 200 including latitude, longitude and altitude. When position information can be acquired from the wireless communication unit 210 or the external input/output unit 213 (for example, wireless LAN), the GPS receiving unit 214 can also detect the position using the position information.

The motion sensor 215 includes a triaxial acceleration sensor or the like, for example, and detects a physical movement of the smart phone 200 according to an instruction of the main control unit 220. By detecting the physical movement of the smart phone 200, a direction and an acceleration where the smart phone 200 moves are detected. The detection result is output to the main control unit 220.

The power source 216 supplies power to be accumulated in a battery (not shown) to respective units of the smart phone 200 according to an instruction of the main control unit 220.

The main control unit 220 includes a micro processor, and is operated according to a control program or control data stored in the storage unit 212 to generally control the respective units of the smart phone 200. Further, the main control unit 220 has a mobile communication control function for controlling respective units of a communication system and an application processing function in order to perform voice communication or data communication through the wireless communication unit 210.

The application processing function is realized as the main control unit 220 is operated according to application software stored in the storage unit 212. As the application processing function, for example, an infrared communication function for controlling the external input/output unit 213 to perform data communication with an opposing device, an e-mail function for performing transmission and reception of e-mail, a Web browsing function for browsing Web pages, or the like is used.

Further, the main control unit 220 has an image processing function, for example, for displaying an image on the display input unit 204 based on image data (data on a still image or a moving image) such as received data or downloaded streaming data. The image processing function refers to a function for decoding the image data by the main control unit 220, performing image processing with respect to the decoded image data, and displaying an image on the display input unit 204.

In addition, the main control unit 220 executes a display control with respect to the display panel 202, and an operation detection control for detecting a user operation through the operation unit 207 or the operation panel 203. By executing the display control, the main control unit 220 displays an icon for starting up application software or a software key such as a scroll bar, or displays a window for creating an e-mail. The scroll bar refers to a software key for receiving, with respect to an image which cannot be accommodated in a display region of the display panel 202, an instruction for movement of a display portion of the image.

Further, by execution of the operation detection control, the main control unit 220 detects a user operation through the operation unit 207, receives an operation with respect to the icon or an input of a character string with respect to an input section of the window through the operation panel 203, or receives a scroll request of a display image through the scroll bar.

Further, by execution of the operation detection control, the main control unit 220 includes a touch panel control function for determining whether an operation position with respect to the operation panel 203 is a portion (display region) that overlaps the display panel 202 or an outer edge portion (non-display region) that does not overlap the display panel 202, and controlling a sensitive region of the operation panel 203 and a display position of a soft key.

In addition, the main control unit 220 may detect a gesture operation with respect to the operation panel 203, and may execute a predetermined function according to the detected gesture operation. The gesture operation does not refer to a typical simple operation, but refers to an operation of drawing a locus using a finger or the like, an operation of simultaneously designating plural positions, or an operation of drawing a locus with respect to at least one of plural positions by combination of the above operations.

The camera unit 208 includes a configuration other than the external memory control unit 20, the recording medium 21, the display control unit 22, the display unit 23, the operation unit 14 in the digital camera shown in FIG. 1.

The captured image data generated by the camera unit 208 may be recorded in the storage unit 212, or may be output through the input/output unit 213 or the wireless communication unit 210.

In the smart phone 200 shown in FIG. 10, the camera unit 208 is mounted on the same surface with the display input unit 204, but the mounting position of the camera unit 208 is not limited thereto, and may be a rear surface of the display input unit 204.

Further, the camera unit 208 may be used for various functions of the smart phone 200. For example, an image acquired by the camera unit 208 may be displayed on the display panel 202, or the image of the camera unit 208 may be used as one of operation inputs through the operation panel 203.

Further, when detecting a position using the GPS receiving unit 214, it is possible to detect the position with reference to an image from the camera unit 208. In addition, it is possible to determine an optical axis direction of the camera unit 208 of the smart phone 200 or a current usage environment thereof without using the triaxial acceleration sensor or by using the triaxial acceleration sensor together, with reference to the image from the camera unit 208. Further, the image from the camera unit 208 may be used in the application software.

Furthermore, position information acquired by the GPS receiving unit 214, voice information (which may be text information obtained by performing voice text conversion by the main control unit or the like) acquired by the microphone 206, posture information acquired by the motion sensor 215, or the like may be added to image data on a still image or a moving image, and the result may be recorded in the storage unit 212, or may be output through the input/output unit 213 or the wireless communication unit 210.

In the smart phone 200 with the above-described configuration, similarly, by using the solid-state imaging element 5 as the imaging element of the camera unit 208, and by performing the processes shown in FIGS. 6 and 8 in the main control unit 220, it is possible to enhance imaging quality in the continuous photographing mode.

As described above, this specification discloses the following content.

An imaging device includes an imaging element that images a subject through an imaging optical system including a focus lens, the imaging element including a first signal detection unit that detects a signal corresponding to one beam of a pair of beams that pass through different portions in a pupil region of the imaging optical system, and a second signal detection unit that detects a signal corresponding to the other beam of the pair of beams, and the imaging device including: a focusing control unit that drives the focus lens to perform a focusing control for focusing on a main subject; a focus lens position generation unit that calculates a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element; a subject distance conversion unit that converts the focus lens position calculated by the focus lens position generation unit into a subject distance which is a distance between the main subject and the focus lens; a subject distance prediction unit that predicts, from the subject distance generated by the subject distance conversion unit and corresponding to each of plural times of image capturing that continue in a time series manner, a subject distance in image capturing performed subsequent to the last image capturing among the plural times of image capturing; a focus lens position prediction unit that predicts, from the focus lens position generated by the focus lens position generation unit and corresponding to each of the plural times of image capturing that continue in a time series manner, a focus lens position in the image capturing performed subsequent to the last image capturing among the plural times of image capturing; and a maximum error information acquisition unit that acquires information about a maximum error with respect to the focus lens position generated by the focus lens position generation unit, in which the focusing control unit selects any one of a first focusing control and a second focusing control as a focusing control performed before the image capturing performed subsequent to the last image capturing, based on the focus lens position generated by the focus lens position generation unit and corresponding to each of the plural times of image capturing that continue in a time series manner and the information about the maximum error, where the first focusing control drives the focus lens according to the focus lens position predicted by the focus lens position prediction unit and the second focusing control drives the focus lens according to the subject distance predicted by the subject distance prediction unit.

In the above imaging device, the focusing control unit converts positions obtained by adding and subtracting the maximum error to and from the focus lens position converted from the subject distance predicted by the subject distance prediction unit into subject distances, respectively, and selects the first focusing control in a case where a difference between the two converted subject distances is greater than a threshold value, or selects the second focusing control in a case where the difference is equal to or smaller than the threshold value.

In the above imaging device, the focusing control unit predicts a first subject distance in the image capturing performed subsequent to the plural times of image capturing from a position obtained by adding the maximum error to the focus lens position corresponding to each of the plural times of image capturing that continue in a time series manner, generated by the focus lens position generation unit, predicts a second subject distance in the image capturing performed subsequent to the plural times of image capturing from a position obtained by subtracting the maximum error from the focus lens position corresponding to each of the plural times of image capturing that continue in a time series manner, and selects the first focusing control in a case where a difference between the first subject distance and the second subject distance is greater than a threshold value, or selects the second focusing control in a case where the difference is equal to or smaller than the threshold value.

In the above imaging device, the imaging optical system is exchangeable, the imaging device further includes: a storage unit that stores information about an arrangement interval of the first signal detection units or the second signal detection units in the imaging element; and an F value acquisition unit that acquires information about an F value of the mounted imaging optical system, and the maximum error information acquisition unit acquires the information about the maximum error by calculating the maximum error from the information about the arrangement interval stored in the storage unit and the information about the F value acquired by the F value acquisition unit.

A focusing control method in an imaging device that includes an imaging element that images a subject through an imaging optical system including a focus lens, the imaging element including a first signal detection unit that detects a signal corresponding to one beam of a pair of beams that pass through different portions in a pupil region of the imaging optical system, and a second signal detection unit that detects a signal corresponding to the other beam of the pair of beams, and the focusing control method including: a focus lens position generation step of calculating a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element; a subject distance conversion step of converting the focus lens position calculated in the focus lens position generation step into a subject distance which is a distance between the main subject and the focus lens; a subject distance prediction step of predicting, from the subject distance generated in the subject distance conversion step and corresponding to each of plural times of image capturing that continue in a time series manner, a subject distance in image capturing performed subsequent to the last image capturing among the plural times of image capturing; a focus lens position prediction step of predicting, from the focus lens position generated in the focus lens position generation step and corresponding to each of the plural times of image capturing that continue in a time series manner, a focus lens position in the image capturing performed subsequent to the last image capturing among the plural times of image capturing; a maximum error information acquisition step of acquiring information about a maximum error with respect to the focus lens position generated in the focus lens position generation step; and a focusing control step of selecting any one of a first focusing control and a second focusing control as a focusing control performed before the image capturing performed subsequent to the last image capturing, based on the focus lens position generated in the focus lens position generation step and corresponding to each of the plural times of image capturing that continue in a time series manner and the information about the maximum error, where the first focusing control drives the focus lens according to the focus lens position predicted in the focus lens position prediction step and a second focusing control drives the focus lens according to the subject distance predicted in the subject distance prediction step, and executing the selected focusing control before the image capturing performed subsequent to the last image capturing.

The invention is particularly applied in a digital camera or the like to provide high convenience and effectiveness.

EXPLANATION OF REFERENCES

1: imaging lens
2: diaphragm
5: solid-state imaging element
11: system control unit
19: phase difference AF processing unit
52A, 52B: phase difference detection pixel

What is claimed is:

1. An imaging device that includes an imaging element that images a subject through an imaging optical system including a focus lens, the imaging element including a first signal detection unit that detects a signal corresponding to one beam of a pair of beams that pass through different portions in a pupil region of the imaging optical system, and a second signal detection unit that detects a signal corresponding to the other beam of the pair of beams, and the imaging device comprising:

a focusing control unit that drives the focus lens to perform a focusing control for focusing on a main subject;

a focus lens position generation unit that calculates a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element;

a subject distance conversion unit that converts the focus lens position calculated by the focus lens position generation unit into a subject distance which is a distance between the main subject and the focus lens;

a subject distance prediction unit that predicts, from the subject distance generated by the subject distance conversion unit and corresponding to each of plural times of image capturing that continue in a time series manner, a subject distance in image capturing performed subsequent to the last image capturing among the plural times of image capturing;

a focus lens position prediction unit that predicts, from the focus lens position generated by the focus lens position generation unit and corresponding to each of the plural times of image capturing that continue in a time series manner, a focus lens position in the image capturing performed subsequent to the last image capturing among the plural times of image capturing;

a storage unit that stores information about an arrangement interval of the first signal detection units or the second signal detection units in the imaging element;

an F value acquisition unit that acquires information about an F value of the imaging optical system, and a maximum error information acquisition unit that acquires information about a maximum error with respect to the focus lens position generated by the focus lens position generation unit, wherein the maximum error information acquisition unit acquires the information about the maximum error by calculating the maximum error from the information about the arrangement interval stored in the storage unit and the information about the F value acquired by the F value acquisition unit, wherein the focusing control unit, as a focusing control performed before the image capturing performed subsequent to the last image capturing, based on the focus lens position generated by the focus lens position generation unit and corresponding to each of the plural times of image capturing that continue in a time series manner and the information about the maximum error, converts positions obtained respectively by adding and subtracting the maximum error to and from the focus lens position converted from the subject distance predicted by the subject distance prediction unit into subject distances by the subject distance conversion unit, selects a first focusing control which drives the focus lens according to the focus lens position predicted by the lens position prediction unit in a case where a difference between the two converted subject distances is greater than a threshold value, or selects a second focusing control which drives the focus lens according to the subject distance predicted by the subject distance prediction unit in a case where the difference is equal to or smaller than the threshold value.

2. The imaging device according to claim 1,
wherein the focusing control unit predicts a first subject distance in the image capturing performed subsequent to the plural times of image capturing from a position obtained by adding the maximum error to the focus lens position corresponding to each of the plural times of image capturing that continue in a time series manner generated by the focus lens position generation unit, predicts a second subject distance in the image capturing performed subsequent to the plural times of image capturing from a position obtained by subtracting the maximum error from the focus lens position corresponding to each of the plural times of image capturing, and selects the first focusing control in a case where a difference between the first subject distance and the second subject distance is greater than a threshold value or the second focusing control in a case where the difference is equal to or smaller than the threshold value.

3. The imaging device according to claim 2,
wherein the imaging optical system is exchangeable.

4. A focusing control method for an imaging device according to claim 1 comprising:
a focus lens position generation step of calculating a focus lens position which is a position of the focus lens where an image formation surface on which the main subject is image-formed and a light receiving surface of the imaging element match each other, based on a correlation operation result of a detection signal of the first signal detection unit and a detection signal of the second signal detection unit obtained by image capturing performed by the imaging element;

a subject distance conversion step of converting the focus lens position calculated in the focus lens position generation step into a subject distance which is a distance between the main subject and the focus lens;

a subject distance prediction step of predicting, from the subject distance generated in the subject distance conversion step and corresponding to each of plural times of image capturing that continue in a time series manner, a subject distance in image capturing performed subsequent to the last image capturing among the plural times of image capturing;

a focus lens position prediction step of predicting, from the focus lens position generated in the focus lens position generation step and corresponding to each of the plural times of image capturing that continue in a time series manner, a focus lens position in the image capturing performed subsequent to the last image capturing among the plural times of image capturing;

a storage step of storing information about an arrangement interval of the first signal detection units or the second signal detection units in the imaging element;

an F value acquisition step of acquiring information about an F value of the imaging optical system, and a maximum error information acquisition step of acquiring information about a maximum error with respect to the focus lens position generated in the focus lens position generation step; and a focusing control step, as a focusing control performed for the image capturing performed subsequent to the last image capturing, based on the focus lens position generated in the focus lens position generation step and corresponding to each of the plural times of image capturing that continue in a time series manner and the information about the maximum error, of converting positions obtained respectively by adding and subtracting the maximum error to and from the focus lens position converted from the subject distance predicted in the subject distance prediction step into subject distances in the subject distance conversion step, selecting a first focusing control which drives the focus lens according to the focus lens position predicted in the focus lens position prediction step in a case where a difference between the two converted subject distances is greater than a threshold value, or selecting a second focusing control which drives the focus lens according to the subject distance predicted in the subject distance prediction step in a case where the difference is equal to or smaller than the threshold value, and executing the selected focusing control before the image capturing performed subsequent to the last image capturing.

* * * * *